(12) United States Patent
Smith et al.

(10) Patent No.: US 6,330,161 B1
(45) Date of Patent: Dec. 11, 2001

(54) ROTATABLE REMOVABLE COMPUTER POWER SUPPLY

(75) Inventors: Darren B Smith, Windsor; Ronald P Dean, Fort Collins; Samuel M Babb, Ft Collins, all of CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/351,822

(22) Filed: Jul. 12, 1999

(51) Int. Cl.$^7$ ...................................................... H05K 7/00
(52) U.S. Cl. .......................... 361/724; 361/235; 361/392; 361/395; 361/396; 361/340; 361/413; 361/415; 361/724; 361/726; 361/727; 361/752; 361/683; 361/684; 361/680; 16/225; 16/229; 16/257; 16/258; 16/259; 16/262; 16/263; 16/265; 16/266; 16/270; 16/297
(58) Field of Search ..................................... 361/235, 392, 361/415, 340, 683, 752, 680, 726, 727, 724, 334, 395, 396, 413; 16/225, 229, 257, 258, 259, 262, 263, 265, 266, 270, 297

(56) References Cited

U.S. PATENT DOCUMENTS

| 4,570,290 | 2/1986 | Anderson | ................................ | 16/229 |
| 5,032,952 | * 7/1991 | Cooke et al. | ......................... | 361/392 |

* cited by examiner

*Primary Examiner*—Leo P. Picard
*Assistant Examiner*—Yean-Hsi Chang
(74) *Attorney, Agent, or Firm*—Kevin M. Hart (57) ABSTRACT

A computer is disclosed having a power supply assembly that may be rotated into a first position for operating the computer, rotated into a second position for servicing components within the computer, or removed from the computer quickly and easily. The power supply assembly is mounted to a chassis via first and second pivot pins that define an axis of rotation and engage first and second bearing surfaces. The first pivot pin may be disengaged from the first bearing surface without removing a fastener. In one embodinent, the first pivot pin is disengaged from the first bearing surface by relative movement between the first pivot pin and the first bearing surface along the axis of rotation. In another embodiment, the first pivot pin is disengaged from the first bearing surface by passing it through a slot in the bearing surface orthogonal to the axis of rotation. A support member mechanically coupled to the chassis at a hinge is folded downward when the power supply assembly is in the operating position and extended upward to support the assembly when it is in the service position. A power coupling is located within a protrusion on the power supply assembly that aligns with a power coupling hole in the chassis when the assembly is in the operating position. A conductive gasket around the protrusion engages a conductive shroud around the power coupling hole to reduce leakage of electromagnetic energy from the enclosure.

12 Claims, 11 Drawing Sheets

ROTATABLE REMOVABLE COMPUTER POWER SUPPLY

FIELD OF THE INVENTION

This invention relates to computers, and more particularly to mounting arrangements for power supply assemblies within computer enclosures.

BACKGROUND

Two competing goals of computer enclosure design are to make efficient use of the volume contained within the enclosure while also maintaining easy service access to the components that are housed inside. Another goal of computer enclosure design is to minimize the amount of electromagnetic energy that escapes from the enclosure. Yet another goal is to facilitate ease of manufacturing the computer during high-volume production.

One of the largest components that must be housed within any computer enclosure is the power supply. It is therefore an object of this invention to provide a computer having a power supply assembly that may be rotated into a first position for conserving enclosure volume when the computer is to be operated, and rotated into a second position for facilitating access to other components within the enclosure when the computer is to be serviced.

It is a further object of the invention to provide a computer power supply assembly that may be removed from the computer enclosure and replaced quickly, thereby easing manufacture of the computer and further facilitating service of components housed within it.

It is yet a further object of the invention to provide a computer power supply assembly that helps to minimize the amount of electromagnetic energy that escapes from the computer enclosure.

SUMMARY OF THE INVENTION

In one aspect, the invention includes a computer enclosure chassis, first and second pivot pins defining an axis of rotation, first and second pivot pin bearing surfaces in engagement with the first and second pivot pins, respectively, and a power supply assembly rotatably coupled to the chassis by the first and second pivot pins and the first and second pivot pin bearing surfaces. The power supply assembly may be pivoted into a first position for operating the computer and pivoted into a second position for servicing components within the computer. The first pivot pin may be disengaged from the first pivot pin bearing surface without removing a fastener, thus enabling the power supply assembly to be removed from the chassis and replaced quickly and easily.

In an embodiment, relative movement between the first pivot pin and the first pivot pin bearing surface is possible along the axis of rotation. When the first pivot pin and the first pivot pin bearing surface are in a first position relative to each other, the first pivot pin engages the first pivot pin bearing surface, thereby retaining the power supply assembly within the chassis. But when the first pivot pin and the first pivot pin bearing surface are in a second position relative to each other, the first pivot pin clears the first pivot pin bearing surface, enabling the power supply assembly to be removed from the chassis.

In another embodiment, the first pivot pin includes a first dog extending radially outward from its axis, and the first pivot pin bearing surface defines a pivot pin hole large enough to clear the diameter of the first pivot pin but not large enough to clear the first dog. A first notch is included in the pivot pin hole, through which the first dog may pass when the first dog and the first notch are aligned. A second dog may also be provided on the first pivot pin, extending radially outward from the axis of the pivot pin and angularly displaced around the pivot pin from the first dog by a displacement angle greater than 0 degrees but less than 180 degrees. In such an embodiment, the pivot pin hole will include a second notch angularly displaced around the pivot pin hole from the first notch by an amount equal to the displacement angle and sized so that the second dog may pass through the second notch when the second dog and the second notch are aligned.

In yet another embodiment, the first pivot pin bearing surface includes a slot oriented substantially orthogonally with the axis of rotation and through which the first pivot pin may be slidably disengaged from the first pivot pin bearing surface. Thus, the power supply assembly may be removed from the chassis by passing the first pivot pin through the slot. The first pivot pin may include a flat surface, and the slot may be sized so that the first pivot pin may pass through the slot only when the flat surface is aligned parallel with the slot.

In another aspect, the invention includes a support member mechanically coupled to the chassis at a hinge and operable to be placed in a folded position when the power supply assembly is in the first position, and in a supporting position when the power supply assembly is in the second position. A retainer mechanically coupled to the power supply assembly is operable to releasably engage the support member when the power supply assembly is in the second position and the support member is in the supporting position. Thus, the power supply assembly may be held in the service position by the support member during servicing, if desired, without removing the power supply assembly from the chassis. The support member may be spring biased away from the folded position and toward the supporting position so that it automatically engages the retainer as the power supply assembly is rotated from the first to the second position.

In yet another aspect, the invention includes a power coupling hole in the chassis through which an external power source may be coupled to components on the inside of the chassis, and a power coupling located on the power supply assembly so that it substantially aligns with the power coupling hole in the chassis after the power supply assembly has been pivoted into the first position. The chassis may be conductive, and a protrusion provided on the power supply assembly for housing a power coupling. In such an embodiment, a conductive gasket circumscribes the protrusion, and a conductive shroud is fixed to the chassis around at least a portion of the power coupling hole, shaped to contact at least a portion of the gasket when the power supply assembly has been pivoted into the first position. Thus, leakage of electromagnetic energy from the computer enclosure around the power coupling hole is substantially reduced.

DETAILED DESCRIPTION OF THE PREFERRED EMBODIMENTS

Figure 1:
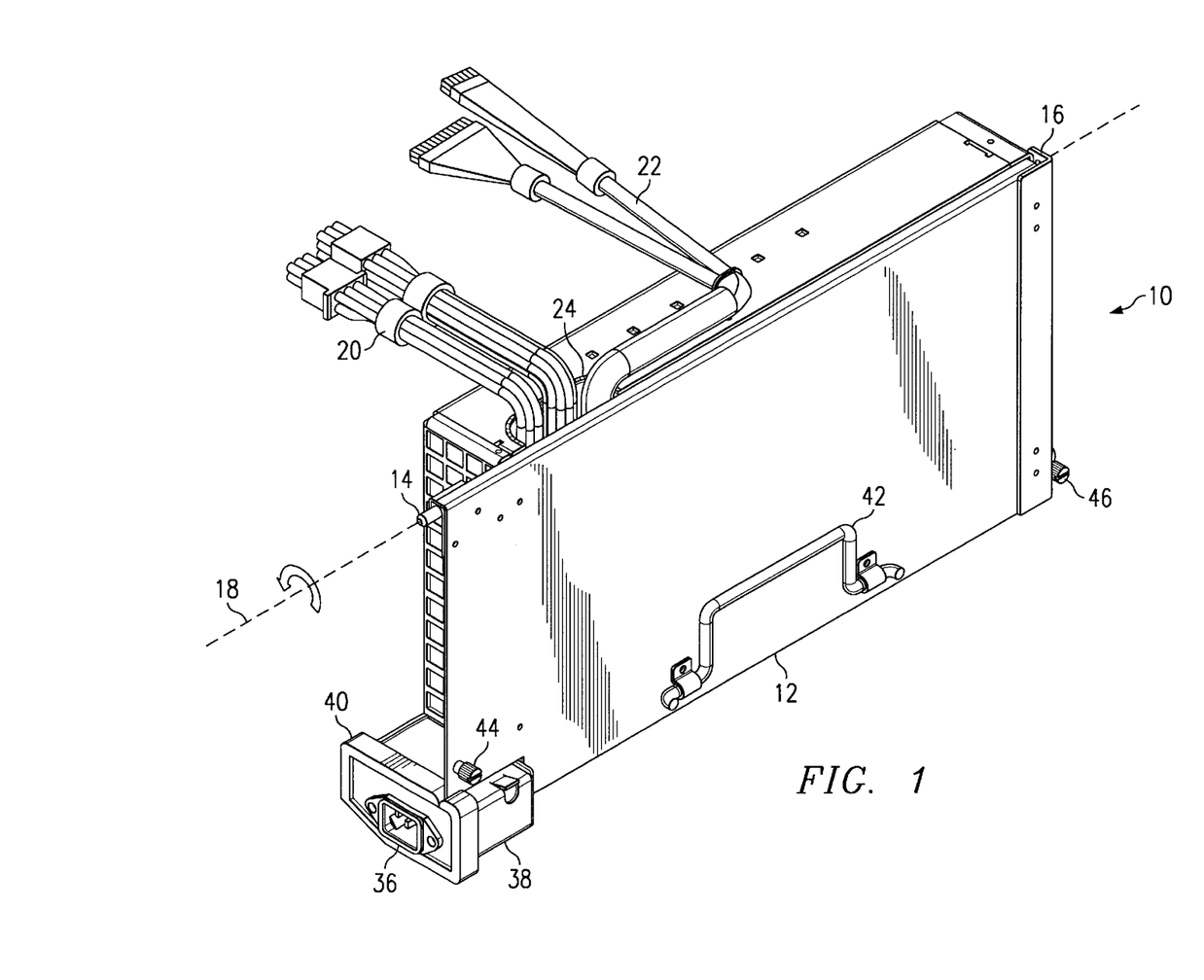
FIG. 1 is an oblique front view of a computer power supply assembly according to a preferred embodiment of the invention.
Figure 2:
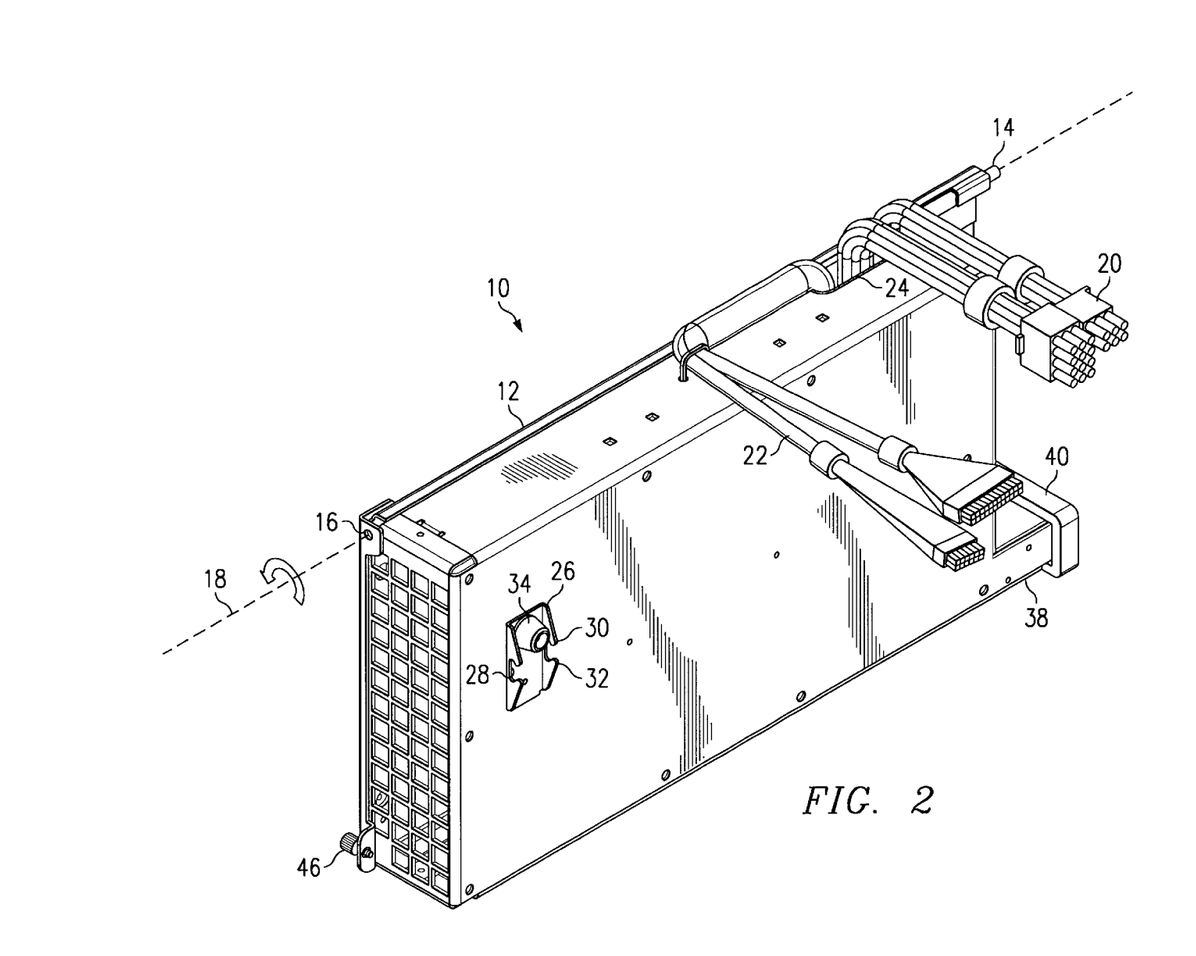
FIG. 2 is an oblique rear view of the computer power supply assembly of FIG.

FIGS. 1 and 2 illustrate a computer power supply assembly 10 according to a preferred embodiment of the invention. Housing 12 encloses the conventional components of the power supply such as the transformer, rectifier, voltage regulator and filter capacitor. Rigidly attached to housing 12, or formed integrally therewith, are a retractable pivot pin assembly 14 and a pivot pin bearing surface 16. Together, bearing surface 16 and the pivot pin within assembly 14 define axis of rotation 18. Power cables 20 and signal cables 22 exit from housing 12 through a cable hole 24 that is disposed radially very close to axis of rotation 18. In an embodiment, cable hole 24 was formed in housing 12 within a one-inch radius of axis 18. The purpose of forming cable hole 24 radially close to axis 18 is to reduce the distance traveled by the housing ends of cables 20 and 22 when the power supply assembly 12 is rotated. Thus, locating cable hole 24 radially close to axis 18 makes it possible to rotate power supply assembly 12 without first unmating cables 20 and 22 from their connection points inside the host computer. It also eliminates the need to make cables 20 and 22 inordinately long.

Retaining bracket 26 is also rigidly attached to, or integrally formed with, housing 12. Retaining bracket 26 includes an aperture 28 for receiving a support member (to be described below). Aperture 28 includes lips 30 and 32 for retaining the support member within aperture 28 after it is received therein. Rubber foot 40 extends away from housing 12 farther than lips 30 and 32; its purpose is to enable the power supply assembly 10 to be laid on a table or other surface without scratching the table or damaging lips 30 and 32.

A power coupling 36 (for example, a recessed male a/c power socket) is housed within a protrusion 38 that extends from power supply assembly 10 as shown. The protrusion 38 and power coupling 36 are located on housing 12 so that power coupling 36 aligns with a power coupling hole in the host computer chassis when power supply assembly 10 is rotated into its operating position (to be described below). Coupling 36 may be connected to an external power source through the power coupling hole in the chassis. A conductive gasket 40 circumscribes protrusion 38. Conductive gasket 40 is preferably made of a resilient, flexible material such as foam rubber covered with a metalized fabric. Other suitable materials may also be used.

In one embodiment, a folding handle 42 was mounted to housing 12. Handle 42 should preferably be displaced radially from axis 18 by a distance sufficient to provide leverage for the user when rotating power supply assembly 10 about axis 18. When not is use, handle 42 may be folded down to the storage position illustrated in FIG. 1.

Fasteners 44, 46 are used to hold power supply assembly 10 in its operating position. They engage corresponding parts fixed to the chassis of the host computer to be described below. In an embodiment, captive screws were used (as shown) so that fasteners 44, 46 would remain attached to housing 12 when the power supply assembly 10 was removed from the host computer.

Figure 3:
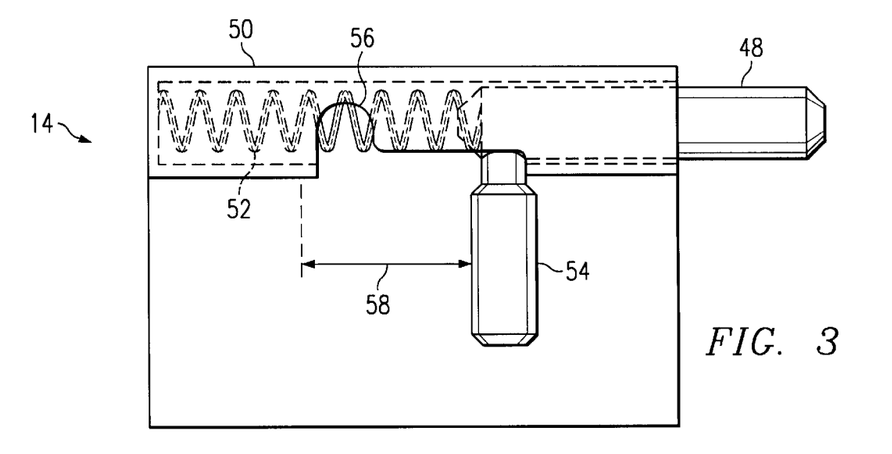
FIG. 3 is a side view of the quick-release pivot pin of the computer power supply assembly of FIG. 1.

FIG. 3 is a close-up orthogonal view illustrating retractable pivot pin assembly 14 in more detail. Pin 48 extends from and may be retracted into pivot pin housing 50. Spring 52 within housing 50 biases pin 48 toward its extended position. Pin handle 54 may be used to move pin 48 to its retracted position, as shown at 58. A notch 56 is provided in housing 50. Handle 54 may be rotated into notch 56 to keep pin 48 in its retracted position.

Figure 4:
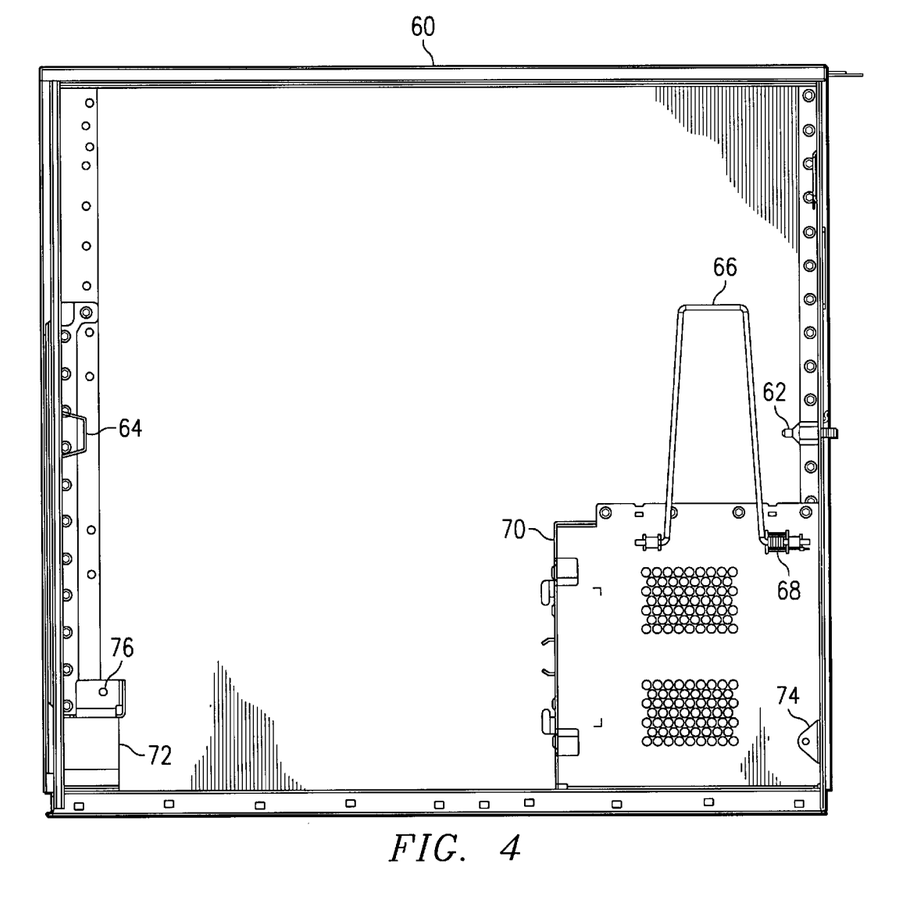
FIG. 4 is a side view of a computer enclosure configured to receive the computer power supply assembly of FIG. 1.

FIG. 4 is a side view of a computer enclosure chassis 60 having a side panel removed to make visible a preferred set of mounting components for receiving power supply assembly 10. A fixed pivot pin 62 is mounted to the front panel of chassis 60, and a pivot pin bearing surface 64 is mounted to the rear panel of chassis 60. In an embodiment, bearing surface 64 was formed with a bracket having a hole in it sufficiently large to receive retractable pivot pin 48. A hinged support member 66 is provided to engage retaining bracket 26 when power supply assembly 10 has been rotated to its servicing position. In the embodiment shown, support member 66 is a bailing wire that is coupled to chassis 60 by means of hinges formed in a hard disk cage 70. A spring 68 biases the bailing wire toward the position illustrated, pointing upward toward the top of chassis 60. A conductive shroud 72 is mounted to chassis 60 and bends around three of the four sides of a rectangular power coupling hole formed in the rear panel of chassis 60. Screw tab 74 is mounted to the front side of chassis 60, as shown, while screw tab 76 is disposed near the rear side of chassis 60. In the embodiment shown, screw tab 76 is formed integrally with conductive shroud 72. Screw tabs 74 and 76 are for the purpose of engaging fasteners 44 and 46 on power supply assembly 10.

One advantage of the invention from a manufacturing point of view is that power supply assembly 10 may be installed into and removed from chassis 60 with a minimum of steps: To install power supply assembly 10 into chassis 60, support member 66 is folded down so that it points toward the bottom chassis 60. Pin 48 is retracted into housing 50. Then, the hole in bearing surface 16 is slipped over fixed pivot pin 62, and retracted pin 48 is aligned with the hole in bearing surface 64. Once pin 48 is so aligned, it is allowed to spring into its extended position, engaging bearing surface 64. Once this has been done, power supply assembly 10 may be freely rotated about axis 18. To remove power supply assembly 10 from chassis 60, pin 48 simply need be retracted from bearing surface 64, and bearing surface 16 disengaged from fixed pivot pin 62. Although fasteners 44 and 46 must be disengaged from tabs 74 and 76 prior to removing power supply assembly 10 from chassis 60, it is an advantage of the invention that the pivot mounts themselves may be disengaged from chassis 60 quickly and without removing any fasteners.

Figure 5:
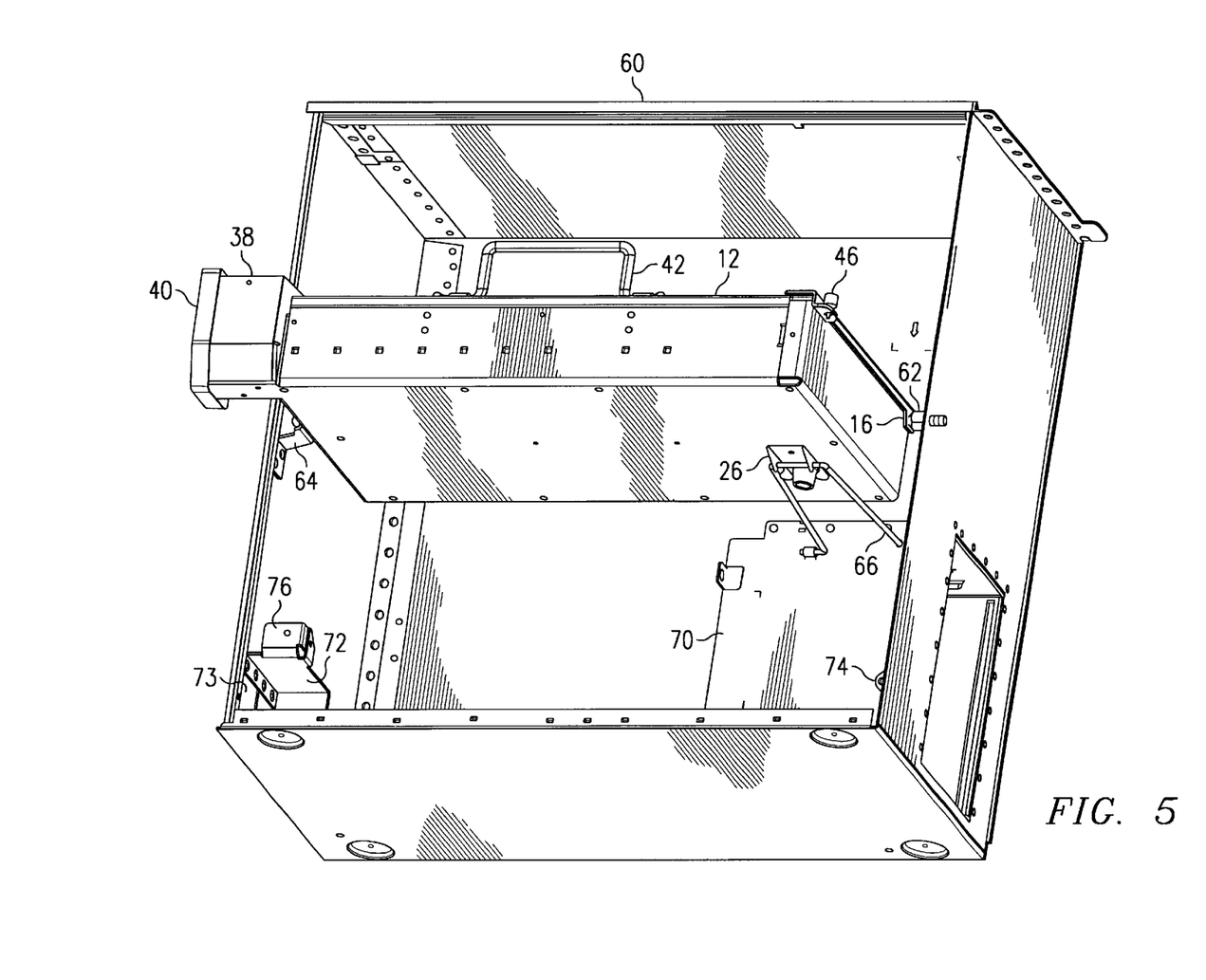
FIG. 5 is an oblique view of the computer enclosure of FIG. 4 with the power supply assembly of FIG. 1 having been installed therein and placed in a service position.
Figure 6:
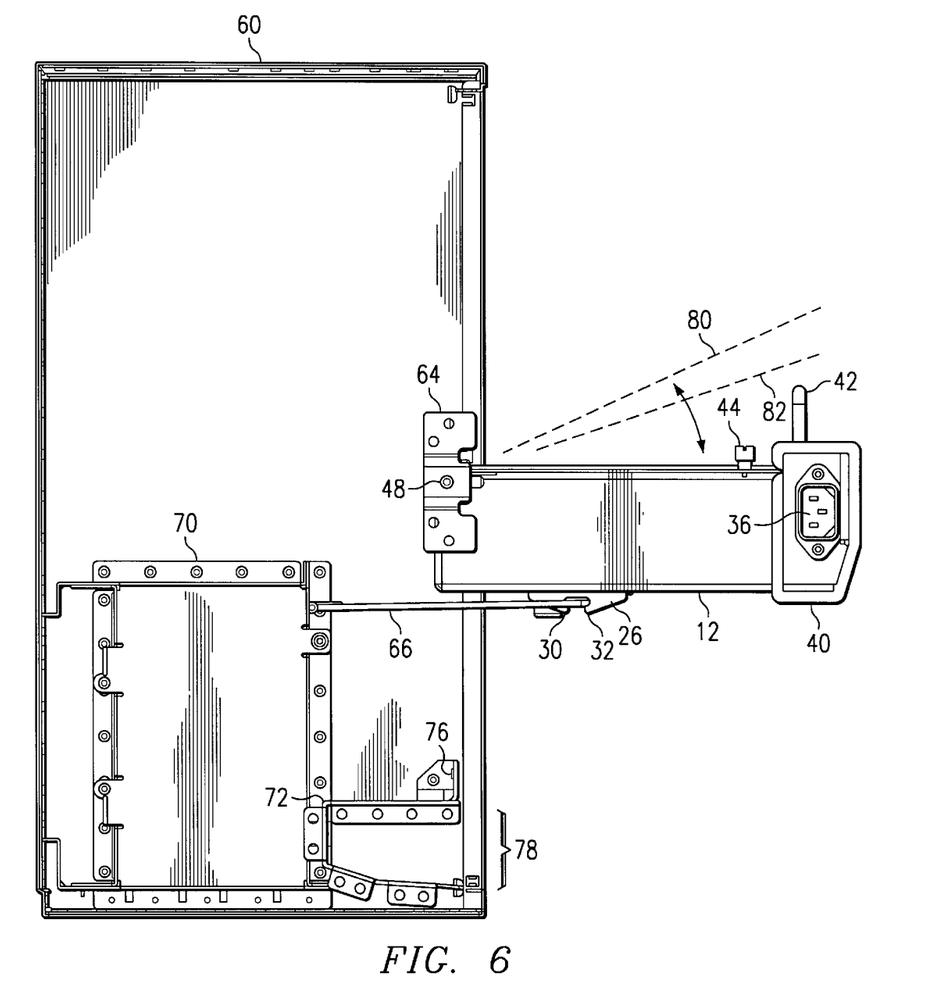
FIG. 6 is a rear end view of the computer enclosure of FIG. 4 with the power supply assembly of FIG. 1 having been installed therein and placed in a service position.

FIGS. 5–10 illustrate power supply assembly 10 in various different stages of rotation. In FIGS. 5 and 6, power supply assembly 10 is rotated into its service position. This position is so named because, when power supply assembly 10 is in this position, components within chassis 60 that were previously obscured by power supply assembly 10 may be accessed for service without removing power supply assembly 10 from chassis 60. In FIGS. 5 and 6, support member 66 has been slipped into aperture 28 of retaining bracket 26. (In the illustration, support member 66 rests against bracket 26 just under lip 32.) With this done, power supply assembly 10 is able to rest against support member 66 in the service position, leaving the operator's hands free to service components within chassis 60. Support member 66 and bracket 26 also serve another function: They prevent power supply assembly 10 from being rotated too far toward the top of chassis 60. If power supply assembly 10 is rotated past the service position toward the top of chassis 60, its rotation will be stopped at the position indicated in by line 80; at that position, support member 66 will engage the other side of aperture 28 just under lip 30, preventing further rotation. Handle 42 is shown in its unfolded position in FIGS. 5 and 6.

Figure 7:
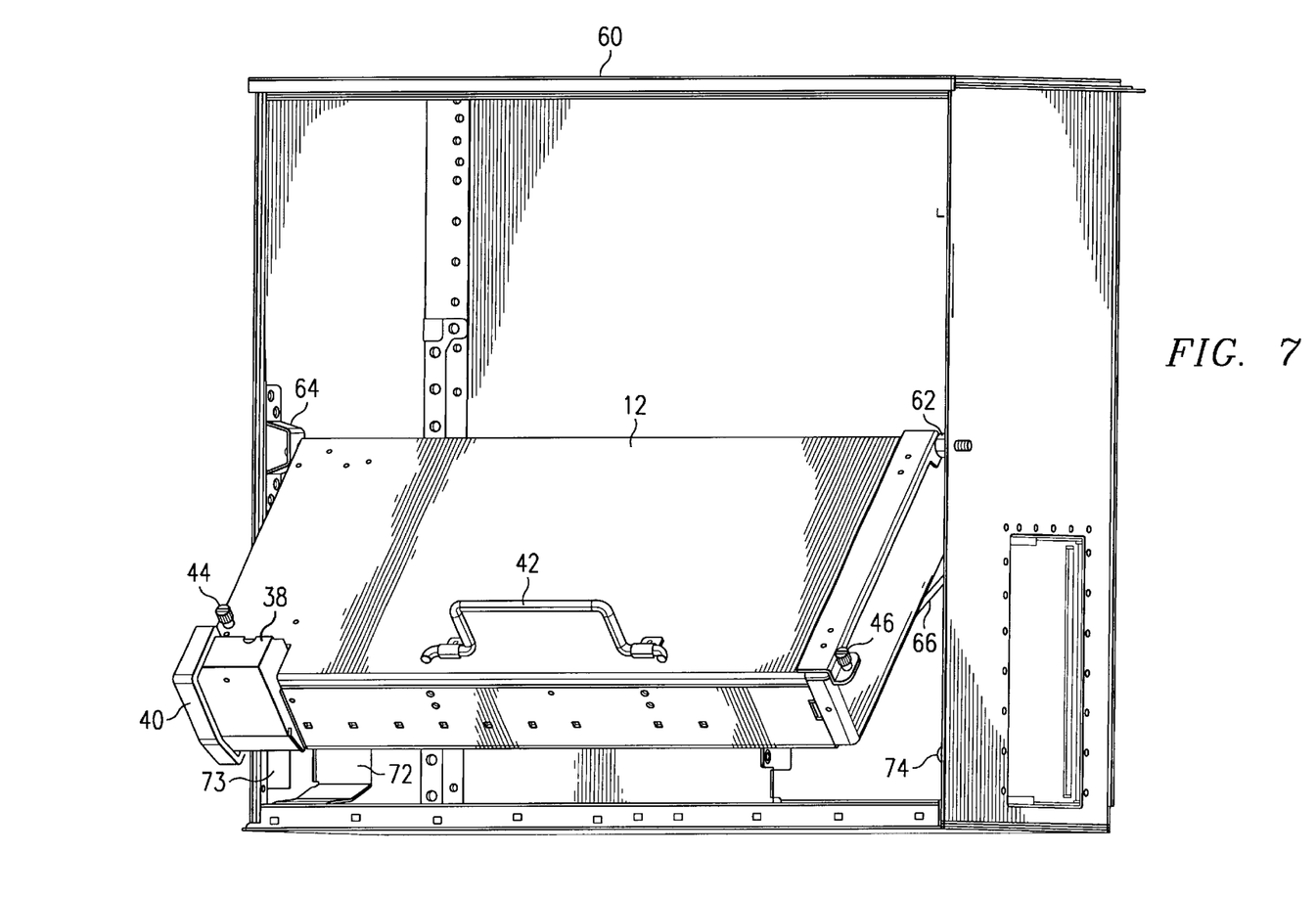
FIG. 7 is an oblique view of the computer enclosure of FIG. 4 with the power supply assembly of FIG. 1 having been installed therein and rotated into a position midway between the service position and an operating position.
Figure 8:
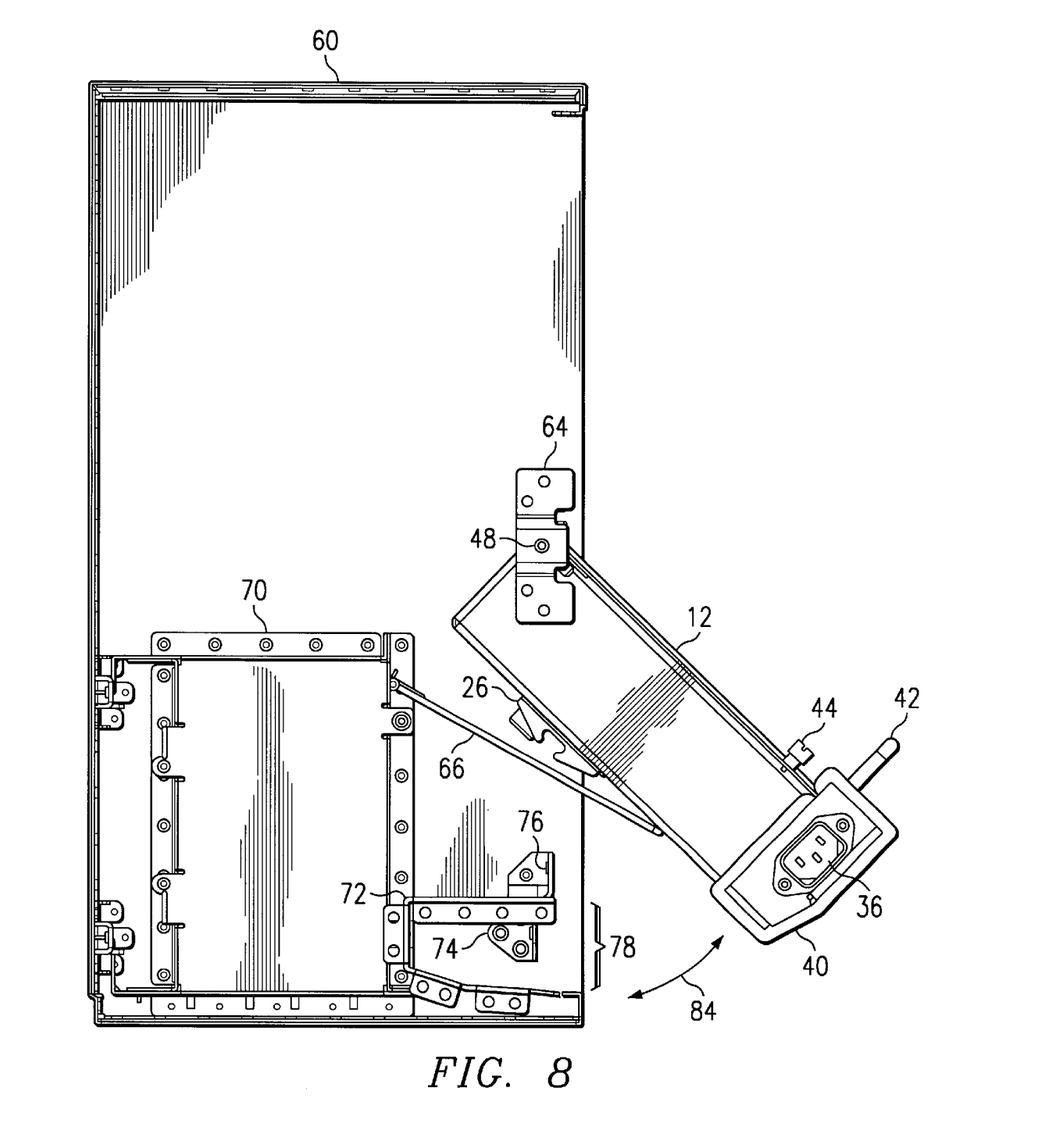
FIG. 8 is a rear end view of the computer enclosure of FIG. 4 with the power supply assembly of FIG. 1 having been installed therein and rotated into a position midway between the service position and an operating position.

Prior to lowering power supply assembly 10 from the service position into the operating position, assembly 10 is first rotated just past the service position to the position indicated by line 82. In that position, support member 66 may be folded downward and out of aperture 28, thus disengaging bracket 26. FIGS. 7 and 8 depict power supply assembly 10 as it appears midway between the service position and the operating position, rotating about axis 18 along arc 84. As can be seen in FIG. 8, conductive shroud 72 is open at an aperture 78. Aperture 78 is preferably large enough to receive protrusion 38 as power supply assembly 10 is rotated downward, but small enough so that shroud 72 compressingly engages conductive gasket 40 as it enters shroud 72. Note that support member 66 slides down against the bottom side of housing 12 as assembly 10 is rotated. It is a feature of the invention that, when power supply assembly 10 is rotated back up from its operating position to its service position, support member 66 automatically slides up against housing 12 until it enters aperture 28 in retaining bracket 26. (This occurs by virtue of the fact that support member 66 is biased upward by spring 68.) Thus, the operator need not insert support member 66 into bracket 26 manually.

Figure 9:
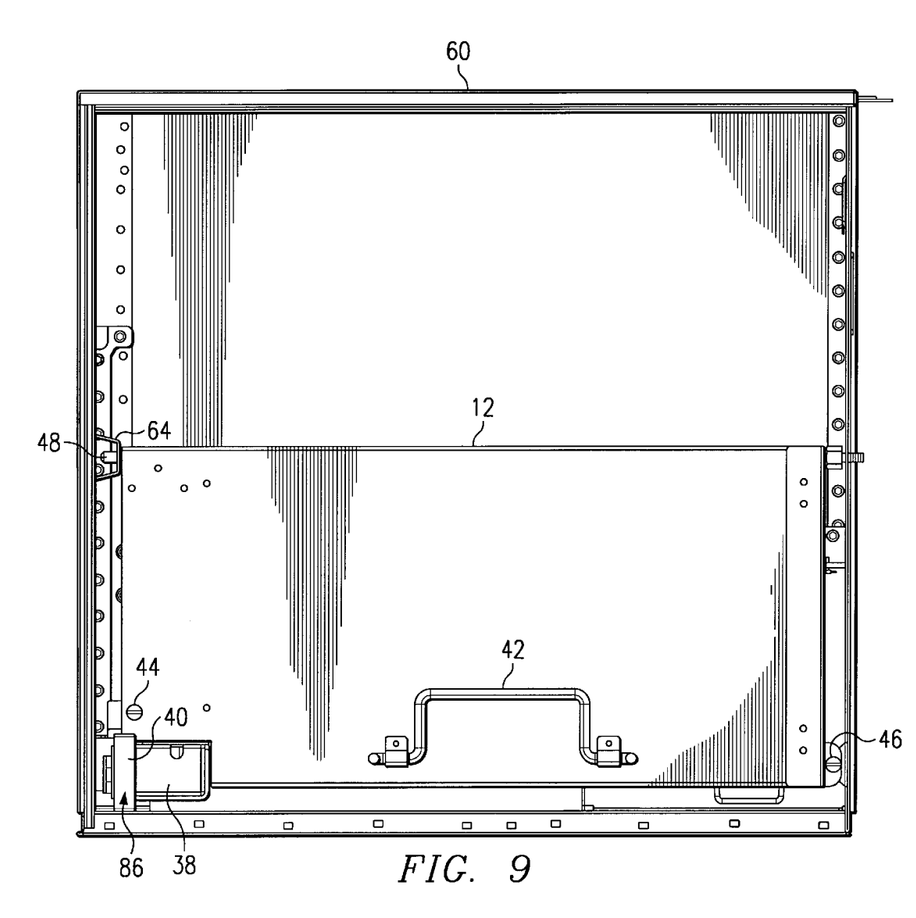
FIG. 9 is a side view of the computer enclosure of FIG. 4 with the power supply assembly of FIG. 1 having been installed therein and rotated into the operating position.
Figure 10:
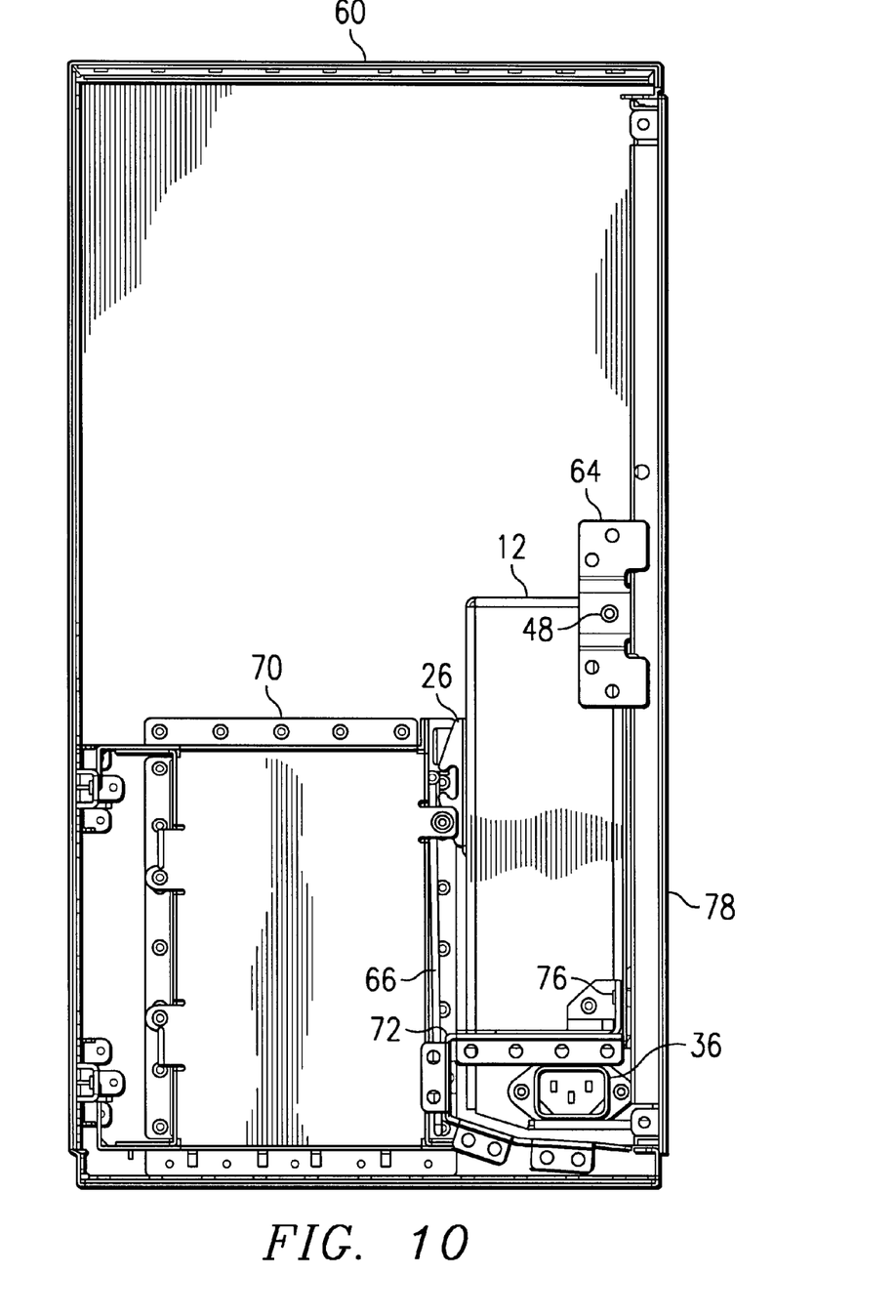
FIG. 10 is a rear end view of the computer enclosure of FIG. 4 with the power supply assembly of FIG. 1 having been installed therein and rotated into the operating position.

FIGS. 9 and 10 depict power supply 10 as it appears in its operating position. As can be seen in FIG. 9, screw 44 has been fastened to screw tab 76 on shroud 72, and screw 46 has been fastened to screw tab 74, thus securing power supply assembly 10 from rotating away from the operating position. Also visible in FIG. 9 is a portion 86 of gasket 40 that is exposed in aperture 78. A conductive side panel 78 is attached to chassis 60 prior to operating the computer, as shown in FIG. 10. Conductive side panel 78 contacts portion 86 of gasket 40 when it is installed and thus completes the electromagnetic interference ("EMI") seal around power coupling 36. (Preferably, chassis 60 should also be constructed of a conductive material such as steel or aluminum.) Visible in FIGS. 5 and 7 is a power coupling hole 73 formed in the rear panel of chassis 60. Power coupling hole 73 and power coupling 36 are located so that they become aligned with one another when power supply assembly 10 is rotated into its operating position.

Note that, in the operating position, volume within the computer enclosure is conserved by virtue of the close proximity of power supply assembly 10 to side panel 78 and the bottom of chassis 60. Handle 42 is folded down into the storage position, as shown, prior to attaching side panel 78 to chassis 60. Support member 66 is folded completely down and rests between housing 12 and hard disk cage 70.

Figure 11:
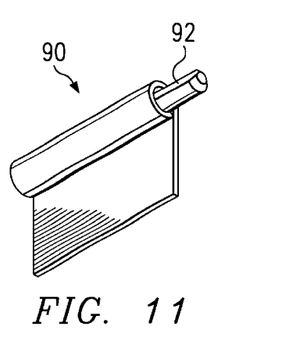
FIG. 11 is an oblique view of a first alternative quick-release pivot pin design according to a preferred embodiment of the invention.
Figure 12:
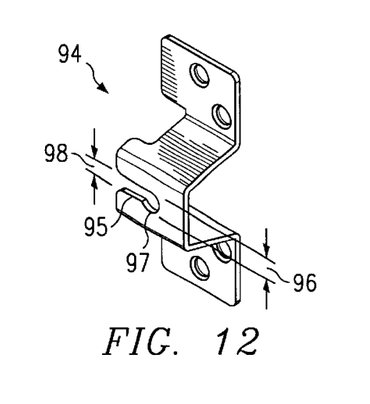
FIG. 12 is an oblique view of a pivot pin bearing surface for use with the pivot pin of FIG. 11.
Figure 13A:
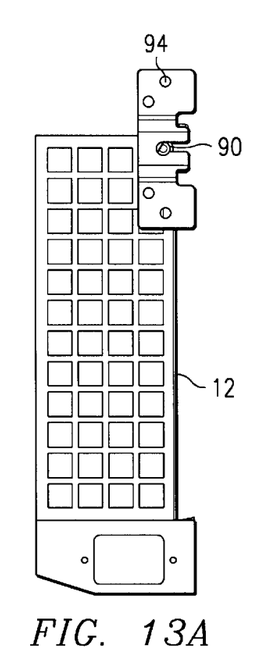
FIGS. 13A–C are end views depicting the pivot pin of FIG. 11 and the bearing surface of FIG. 12 in various stages of rotation.
Figure 13B:
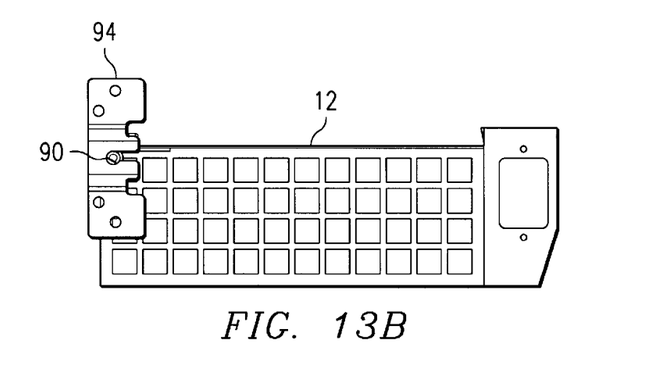
Figure 13C:
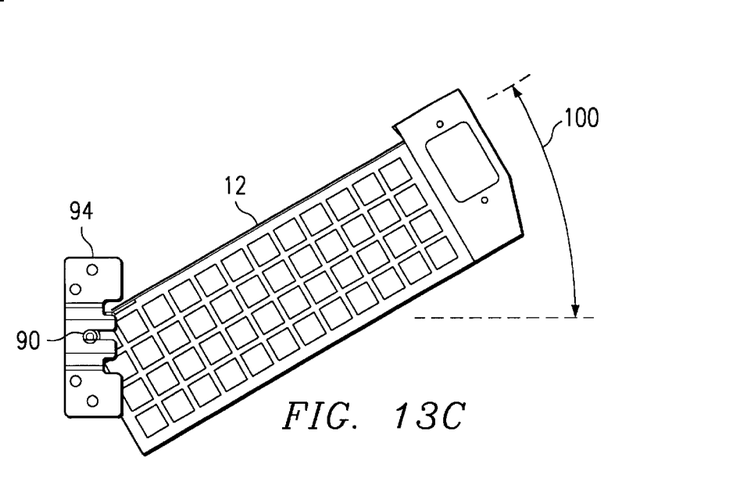

While the embodiment illustrated in FIGS. 5–10 achieve this quick-release functionality by means of retractable pivot pin assembly 14, alternative quick-release means may also be used with similar results. By way of example, FIGS. 11–13 illustrate a first alternative quick-release pivot pin design. A fixed pivot pin 90 is attached to housing 12 in lieu of retractable pivot pin assembly 14, and a slotted bracket 95 replaces bearing surface 64. As can be seen in FIG. 11, pin 90 has a flat surface 92 formed thereon. As can be seen in FIG. 12, the slot 95 of bracket 94 has a width 98 that is narrower than the diameter 96 of hole 97. Preferably, diameter 96 is just larger than the largest diameter of pin 90, and width 98 is just larger than the smallest diameter of pin 90. In this manner, pin 90 may pass through slot 95 when the flat surface 92 is oriented parallel with slot 95, but may not pass through otherwise. Thus, pin 90 is engaged with bearing surface 94 by orienting flat surface 92 parallel with slot 95 and passing pin 90 through slot 95 until it rests within hole 97, where it may be rotated. FIGS. 13A–C are provided to show pin 90 and bearing surface 94 in operation. In FIG. 13A, power supply assembly 10 is in the operation position, and flat surface 92 on pin 90 faces toward the upper left. In FIG. 13B, power supply assembly 10 has been rotated into the service position, and flat surface 92 of pin 90 faces toward the lower left. Only when power supply assembly 10 is rotated through an angle 100 past the service position, as shown in FIG. 13C, does flat surface 92 become parallel with slot 95, enabling pin 90 to be disengaged from bearing surface 94.

Figure 14:
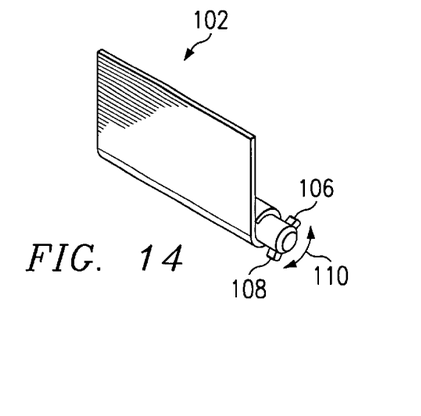
FIG. 14 is an oblique view of a second alternative quick-release pivot pin design according to a preferred embodiment of the invention.
Figure 15:
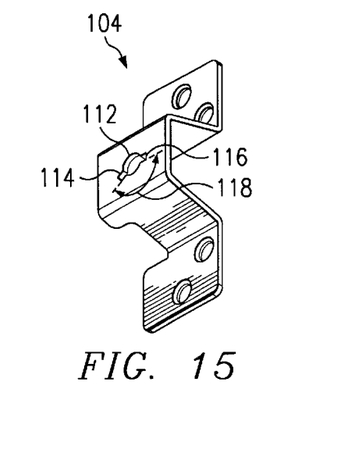
FIG. 15 is an oblique view of a pivot pin bearing surface for use with the pivot pin of FIG. 14.
Figure 16A:
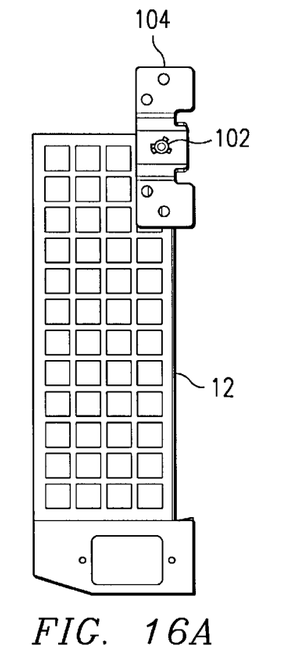
FIGS. 16A–C are end views depicting the pivot pin of FIG. 14 and the bearing surface of FIG. 15 in various stages of rotation.
Figure 16B:
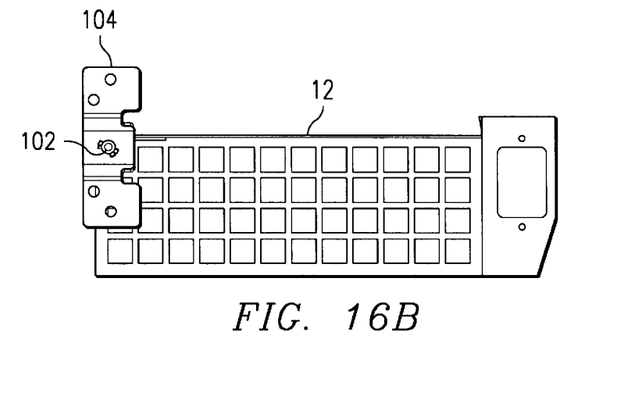
Figure 16C:
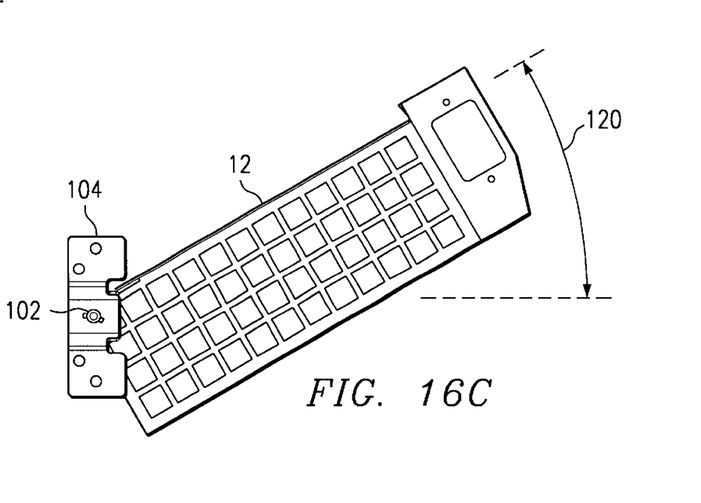

FIGS. 14–13 illustrate a second alternative quick-release pivot pin design. A fixed pivot pin 102 is attached to housing 12 in lieu of retractable pivot pin assembly 14, and a bracket 104 replaces bearing surface 64. As can be seen in FIG. 14, pin 102 has first and second dogs 106, 108 extending radially from its axis. Dog 108 is displaced around the pin from dog 106 by a displacement angle 110. Preferably, displacement angle 110 is greater than 0 degrees but less than 180 degrees, so that only one rotational position of pin 102 relative to bracket 104 will enable it to pass through the hole 112 in bracket 104. Hole 112 has first and second notches 114, 116 formed therein. Notches 114, 116 are displaced from one another around hole 112 by a displacement angle 118 that is equal to displacement angle 110. Pin 102 is engaged with bearing surface 104 by aligning dogs 106, 108 with notches 114, 116 and inserting it through hole 112. Once so engaged, pin 102 may be rotated freely within hole 112. FIGS. 16A–C are provided to show pin 102 and bearing surface 104 in operation. In FIG. 16A, power supply assembly 10 is in the operation position; but the dogs on pin 102 are not aligned with the notches in bearing surface 104, so pin 102 is retained therein. In FIG. 16B, power supply assembly 10 has been rotated into the service position; again, the dogs on pin 102 are not aligned with the notches in bearing surface 104, so pin 102 is retained. Only when power supply assembly 10 is rotated through an angle 120 past the service position (as shown in FIG. 13C) do the dogs on pin 102 align with the notches in bearing surface 104, enabling pin 102 to be disengaged from bearing surface 104. Sufficient clearance for lateral movement of power supply assembly 10 along axis 18 must be allowed at the side of pin 62 and bearing surface 16 so that pin 102 may be disengaged from bearing surface 104 after the dogs and notches have been aligned.

While the invention has been described in detail in relation to specific preferred embodiments thereof, the described embodiments have been presented by way of example and not by way of limitation. It will be understood by those skilled in the art that various changes may be made in the form and details of the described embodiments, resulting in equivalent embodiments that will remain within the scope of the appended claims.

What is claimed is:

1. A computer, comprising:

a chassis;

first and second pivot pins defining an axis when engaged with first and second bearing surfaces; and a power supply assembly rotatably coupled to the chassis by the first and second pivot pins and bearing surfaces; wherein:

relative movement between the first pivot pin and the first bearing surface is possible along the axis;

the first pivot pin includes a first dog extending radially outward from the axis;

the first bearing surface defines a hole large enough to clear the diameter of the first pivot pin but not large enough to clear the first dog; and the hole includes a first notch through which the first dog may pass when the first dog and the first notch are aligned.

2. The computer of claim 1, wherein:

the first pivot pin includes a second dog extending radially outward from the axis and angularly displaced around the pivot pin from the first dog by a displacement angle greater than 0 degrees but less than 180 degrees; and the hole includes a second notch angularly displaced around the hole from the first notch by an amount equal to the displacement angle and sized so that the second dog may pass through the second notch when the second dog and the second notch are aligned.

3. A computer, comprising:

a chassis;

first and second pivot pins defining an axis when engaged with first and second bearing surfaces; and a power supply assembly rotatably coupled to the chassis by the first and second pivot pins and bearing surfaces; wherein:

the first bearing surface includes a slot oriented substantially orthogonally with the axis and through which the first pivot pin may be slidably disengaged from the first bearing surface thereby enabling the power supply assembly to be removed from the chassis.

4. The computer of claim 3, wherein:

the first pivot pin includes a flat surface; and the slot is sized so that the first pivot pin may pass through the slot when the flat surface is aligned parallel with the slot, but may not pass through the slot when the flat surface is not aligned parallel with the slot.

5. A computer, comprising:

a chassis;

first and second pivot pins defining an axis when engaged with first and second bearing surfaces;

a power supply assembly rotatably coupled to the chassis by the first and second pivot pins and bearing surfaces;

a support member mechanically coupled to the chassis at a hinge and operable to be placed in a folded position when the power supply assembly is in a first position, and in a supporting position when the power supply assembly is in a second position; and a retainer mechanically coupled to the power supply assembly and operable to releasably engage the support member when the power supply assembly is in the second position and the support member is in the supporting position.

6. The computer of claim 5, wherein:

the support member is spring biased away from the folded position and toward the supporting position so that it automatically engages the retainer as the power supply assembly is rotated from the first to the second position.

7. The computer of claim 6, wherein:

the support member is a bailing wire; and the retainer is a bracket that includes an aperture for receiving the bailing wire and an overhang for retaining the bailing wire within the aperture once received.

8. The computer of claim 5, wherein:

the support member is a bailing wire; and the retainer is a bracket that includes an aperture for receiving the bailing wire and an overhang for retaining the bailing wire within the aperture once received.

9. A computer, comprising:

a conductive chassis having a power coupling hole therein through which an external power source may be coupled to components on the inside of the chassis;

first and second pivot pins defining an axis when engaged with first and second bearing surfaces;

a power supply assembly rotatably coupled to the chassis by the first and second pivot pins and bearing surfaces;

a power coupling located on the power supply assembly so that it substantially aligns with the power coupling hole in the chassis after the power supply assembly has been pivoted into a first position;

a protrusion extending from the power supply assembly, the protrusion housing the power coupling;

a conductive gasket circumscribing the protrusion; and a conductive shroud fixed to the chassis around at least a portion of the power coupling hole and shaped to contact at least a portion of the gasket when the power supply assembly has been pivoted into the first position.

10. The computer of claim 9, wherein the shroud includes an opening through which the protrusion may pass when the power supply assembly is pivoted into and out of the first position; and further comprising a movable conductive panel which, when mounted to the chassis after the power supply assembly has been placed in the first position, contacts a portion of the gasket that is exposed at the opening.

11. A computer, comprising:

a chassis;

first and second pivot pins defining an axis when engaged with first and second bearing surfaces;

a power supply assembly rotatably coupled to the chassis by the first and second pivot pins and bearing surfaces; and a cable for communicating power from the power supply assembly to other components within the chassis, wherein the cable exits the power supply assembly from a cable hole located within approximately one inch measured radially from the axis.

12. A rotatable, removable computer power supply assembly, comprising:

a power supply housing;

a retractable pivot pin on the power supply housing, the retractable pivot pin operable, when extended, to pass at least partially through a first pivot support on a computer enclosure;

a second pivot support on the power supply housing, the second pivot support operable to receive a fixed pivot pin on the computer enclosure;

the retractable pivot pin and the second pivot support defining an axis about which the power supply housing may be rotated from a first position to a second position after the fixed pivot pin has been engaged with the second pivot support and the retractable pivot pin has been extended and engaged with the first pivot support;

a handle foldably mounted to the power supply housing, the handle operable to be folded out to facilitate rotating the power supply housing about the axis and to be folded in for low-profile storage when the handle is not in use;

a fastener on the power supply housing for engaging a power supply retaining support on the computer enclosure after the power supply housing has been rotated to the first position; and a retainer bracket on the power supply housing for releasably engaging a support member after the power supply housing has been rotated to the second position.

* * * * *